Jan. 18, 1927.

L. D. SOUBIER 1,614,936

GLASS FEEDER

Original Filed June 12, 1922 2 Sheets-Sheet 1

INVENTOR
LEONARD D. SOUBIER

BY *J.F.Rule*
HIS ATTORNEY

Jan. 18, 1927.

L. D. SOUBIER

GLASS FEEDER

Original Filed June 12, 1922

1,614,936

INVENTOR
LEONARD D. SOUBIER

BY J.F. Rule,
HIS ATTORNEY

Patented Jan. 18, 1927.

1,614,936

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed June 12, 1922, Serial No. 567,533. Renewed August 15, 1925.

My invention relates to apparatus for feeding charges of molten glass and particularly to a glass feeder of the type in which the glass is discharged through an outlet opening in the bottom of a container, the discharge being regulated and controlled as by means of a periodically reciprocated regulating plunger projecting into the glass above the outlet. In feeders of this type, the outlet opening is commonly provided in the floor of a furnace boot or extension, adjacent the forward end of the boot. The regulating plunger is reciprocated directly in the main body of the glass in the boot, which gives a comparatively poor control over the shape and size of the issuing charges of glass. A further objectionable feature is that the current of the issuing glass is in a direct line from the furnace to the inner side of the outlet opening, so that there is a stagnation and chilling of the glass on the side of the opening farthest from the furnace. As a result, the issuing column of glass is unsymmetrical and not of uniform temperature. This produces defects in the finished ware.

An object of the present invention is to provide means for separating from the main supply, a comparatively small mass of the glass over the outlet so that the expelling and retarding effect of the reciprocating plunger or regulator is greater and under better control than when said regulator is working in a comparatively large mass of glass.

A further object of the invention is to provide suitable means for causing the glass issuing from the outlet to be drawn from the supply at a point beneath the surface thereof, whereby a better quality of glass is supplied.

A further object of the invention is to provide a practical construction in which the issuing mass or column of glass is symmetrical and of uniform temperature on all sides.

Other objects of the invention will appear hereinafter.

There is disclosed herein subject matter also disclosed in my co-pending applications, Serial Number 385,591, means for forming charges of molten glass, and Serial Number 690,408, method and apparatus for producing charges of molten glass.

Figure 1:
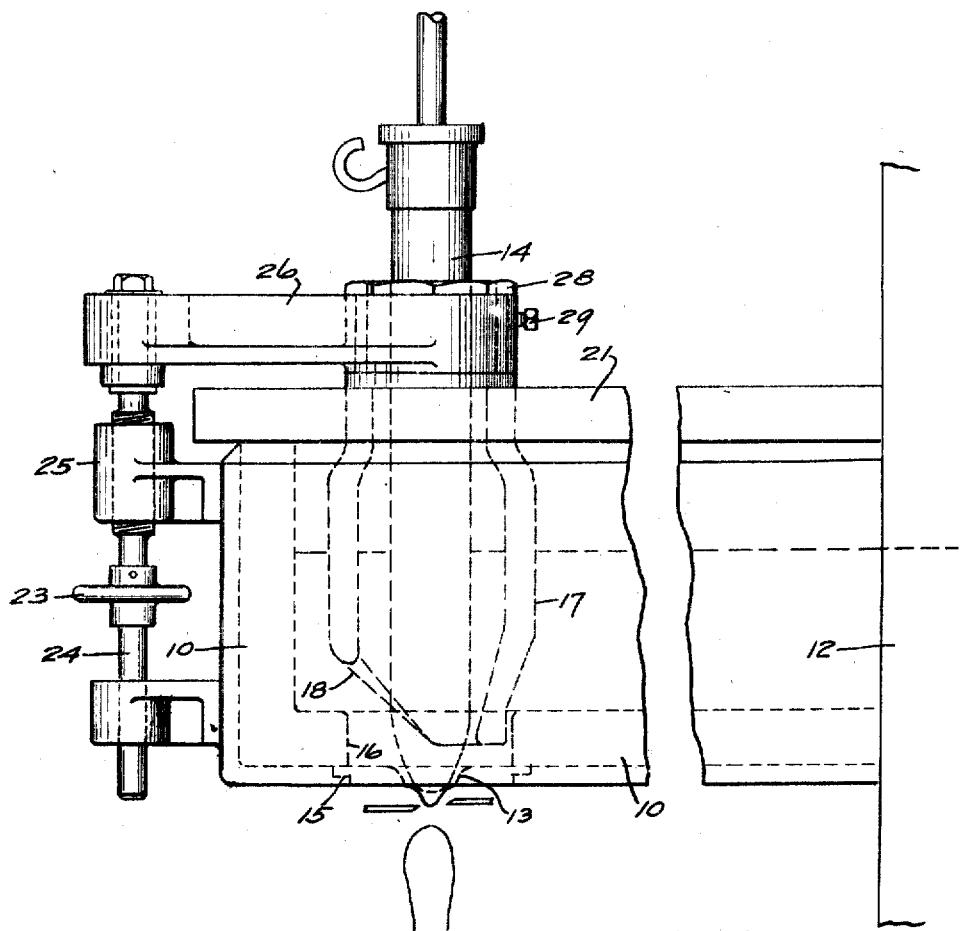
Figure 1 is a side elevation of apparatus constructed in accordance with my invention.

A furnace boot or extension 10 is continuously supplied with molten glass 11 from the furnace 12. The glass issues periodically through an outlet opening 13 in the floor of the boot. The discharge of glass is regulated by a clay plunger or regulator 14 which projects vertically downward into the glass and is periodically reciprocated vertically. The upward movement of the plunger operates to retard or reverse the flow through the outlet, and its downward movement exerts an expelling action on the glass.

The opening 13, as shown, is formed in a clay bushing 15 above which is an opening or well 16 in the floor of the boot.

Figure 4:
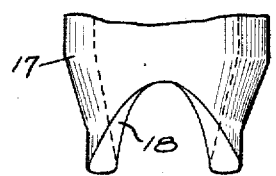
Figure 4 is a fragmentary elevation view of the lower end of the housing shown in Figure 2.

Surrounding the regulator 14 is a housing 17 consisting of a substantially cylindrical wall formed of refractory material. The internal diameter of this wall is substantially greater than the diameter of the regulator to provide a chamber of sufficient capacity to hold enough glass to form one or more charges. The lower end of the wall 17 is tapered downwardly and inwardly and projects within the well 16. The wall 17 is extended upward through the cover 21 of the boot and is of reduced diameter at its upper portion. The wall is cut away at 18 to form a substantially V-shaped recess, as shown in Figure 4, providing a passageway at the front of the regulator through which the glass may freely enter the housing 17. At the rear of the regulator a comparatively narrow space 19 is provided which permits a restricted flow of glass between the housing 17 and the walls of the well 16, so that these parts will not freeze together. The greater portion of the glass, however, is caused to flow around the housing 17 and into the later at the front of the regulator. In this manner, the glass is maintained at substantially uniform temperature on all sides of the regulator and chilling and stagnation of the glass at the front of the boot is prevented. It will be seen that with this arrangement, the glass issuing from the outlet 13 is drawn from the supply at a point beneath the surface thereof, which glass is of better quality and at a higher and more uniform temperature than the surface glass. An opening 20 may be provided through the wall of the housing at a point above the glass level. This opening permits the hot gases to enter said housing and maintain a high temperature above the glass within the housing. The regulator 14 is also thereby protected against extreme and sudden variations of temperature which cause frequent cracking and breakage of such regulators.

The part 17 is adjustable vertically by means of a hand wheel 23 on a vertical rod 24 having a screw threaded mounting in a stationary bearing sleeve 25, the upper end of said rod being rotatively connected to an arm 26 carrying the housing 17. By adjustment of the part 17 up or down, the opening 18 may be more or less restricted to regulate the flow of glass therethrough. The housing 17 is also rotatively adjustable. For this purpose the arm 26 is mounted on a sleeve 28 fixed to the housing, and rotatable in said arm. A set screw 29 holds the housing in adjusted position.

Figure 5:
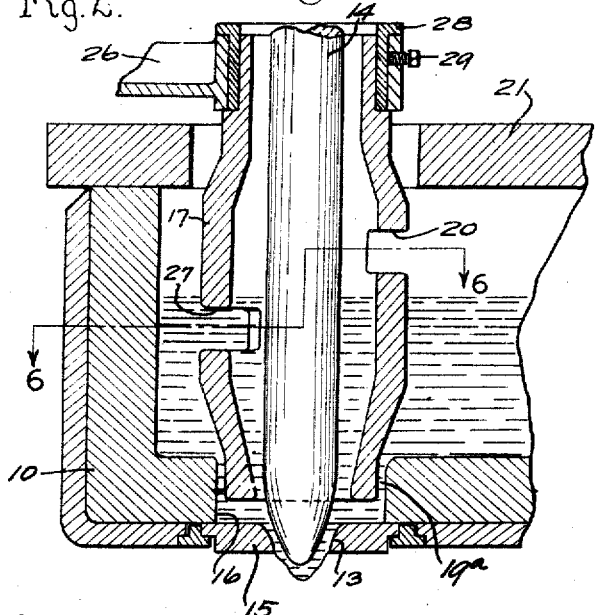
Figure 5 is a sectional side elevation of a modified construction.
Figure 6:
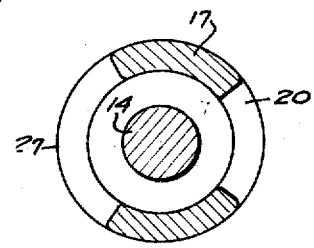
Figure 6 is a section through the regulator and the surrounding housing, the section being taken at the line 6—6 on Figure 5.

Figures 5 and 6 show a modification of the housing 17. In this construction the recess 18 is omitted, the lower end of said housing extending downward to the same level on all sides of the regulator. There is thus provided an annular passageway 19ª between the walls of the well 16 and the lower end of the housing, which passageway is of equal width at all sides of the regulator. An opening 27 is provided in the wall 17 below the level of the glass in the boot and preferably near the surface of the glass. This opening is at the front side of the regulator 14. With this arrangement of the opening 27, the glass which is expelled through the outlet 13, or the major portion of such glass, is caused to flow forward to the front end of the boot and enter said opening 27, so that stagnation and freezing of the glass at the front of the boot is prevented.

Figure 2:
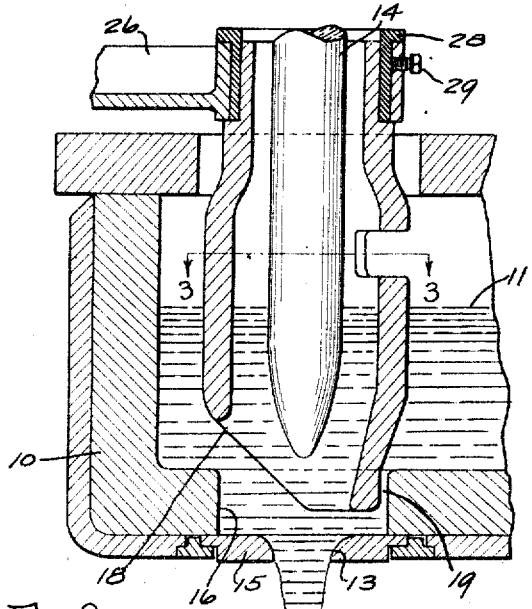
Figure 2 is a sectional side elevation of the same.
Figure 3:
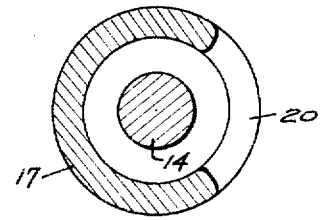
Figure 3 is a section at the line 3—3 on Figure 2.

In operation, the regulator 14 is periodically reciprocated vertically. As the regulator rises, the glass enters the chamber 17 through the opening 18 (Fig. 2) or the opening 27 (Fig. 5), the in-flow of glass being assisted by the pull of the regulator on the glass adhering thereto. The downward movement of the regulator then displaces a portion of the glass in said chamber, forcing it through the outlet orifice 13. It will be noted that the regulator acts on a comparatively small volume of glass, the main body of glass being separated therefrom by the wall 17, so that the expelling and retarding actions of the regulator are more pronounced and under better control than with the usual arrangement in which such wall is omitted. There is a seepage or restricted flow of glass through the passage 19 (or 19ª) and under some conditions this passage may be enlarged so that a considerable portion of the glass flows therethrough.

Modifications may be resorted to within the spirit and scope of my invention.

What I claim is:

1. The combination of a container for molten glass having an outlet opening in the bottom thereof, a regulator in the glass above said outlet, a wall surrounding and spaced from said regulator, said wall extending from the surface of the glass substantially to the floor of the receptacle, and provided with an opening at one side thereof below the level of the glass through which the glass is guided into the space between said wall and regulator.

2. The combination of a furnace boot or extension having an outlet opening in the bottom thereof for the discharge of molten glass, a vertically reciprocating plunger projecting downward into the glass in said boot in line with said opening, a protecting wall surrounding said plunger and spaced therefrom to provide a chamber to contain molten glass, said wall extending downward to a point adjacent the floor of the boot and also extending upward above the level of the glass and provided with an inlet opening at one side thereof below the glass level, said inlet opening being positioned and arranged to cause the glass to enter said chamber mainly at one side thereof.

3. The combination of a furnace boot or extension having an outlet opening in the bottom thereof for the discharge of molten glass, a vertically reciprocating plunger projecting downward into the glass in said boot in line with said opening, a protecting wall surrounding said plunger and spaced therefrom to provide a chamber to contain molten glass, said wall extending downward to a point adjacent the floor of the boot and also extending upward above the level of the glass, said wall having an inlet opening therethrough at the front side of the plunger below the level of the glass through which the glass enters said chamber in its passage to the discharge outlet.

4. The combination of a container for molten glass having an outlet opening in the bottom thereof, a regulator in the glass above said outlet, a stationary wall surrounding and spaced from said regulator, and means for adjusting said wall up and down.

5. The combination of a container for molten glass, a well in the floor of the container provided with an outlet opening at the bottom thereof, a regulating plunger projecting downwardly through the glass in the container and into said well, a wall within the container surrounding said plunger, a restricted passageway being provided between the lower end of the wall and the wall of said well, means to adjust said first mentioned wall up and down and thereby regulate the amount of glass passing through said passageway to the outlet, and means to direct a portion of the glass to the outlet independently of said restricted passageway.

6. The combination of a container for molten glass having an outlet opening in the bottom thereof, a regulator in the glass above said outlet, and a wall surrounding and spaced from said regulator, said wall extending from the surface of the glass substantially to the floor of the receptacle and provided with an inlet opening therethrough below the level of the glass in the container through which the glass enters said chamber in its passage to the said outlet.

7. The combination of a container for molten glass, a well in the floor of the container provided with a normally open outlet opening at the bottom thereof, means to cause a periodically regulated discharge of glass through said opening comprising a vertically reciprocating regulating plunger projecting downwardly through the glass in the container and into said well, a wall within the container surrounding said plunger, a restricted passageway being provided between the lower end of the wall and the wall of said well through which glass is directed to the outlet opening, and means for adjusting the size of said passageway.

8. The combination of a container for molten glass, having an outlet opening in the bottom thereof, a regulator in the glass above said outlet, a stationary wall surrounding said regulator and spaced from said outlet to permit the passage of a portion of the glass to said outlet, said wall having an inlet opening below the glass level through which another portion of the glass is directed in its passage to said outlet, and means to adjust said inlet opening and thereby regulate the proportion of glass passing therethrough.

9. The combination of a container for molten glass having an outlet opening in the bottom thereof, a regulator in the glass above said outlet, a stationary wall surrounding said regulator and spaced from said outlet to permit the passage of a portion of the glass to said outlet, said wall having an inlet opening below the glass level through which another portion of the glass is directed in its passage to said outlet, and means for adjusting said inlet opening up and down and thereby regulating the proportion of glass passing therethrough.

10. The combination of a container for molten glass having an outlet opening in the bottom thereof, a regulator in the glass above said outlet, and a wall surrounding and spaced from said regulator, said wall being provided with an inlet opening in one side thereof and rotatively adjustable about a vertical axis.

11. In an apparatus for feeding molten glass, the combination with a container for the glass provided with a submerged outlet, of means for controlling the flow of glass to the outlet comprising a member having an annular lower end submerged in the glass adjacent the outlet, and an inlet in said member through which the glass may flow downwardly through said annular lower end.

12. In an apparatus for segregating mold charges from a body of molten glass, the combination with a container for the glass provided with a discharge outlet, of a member in vertical alignment with said outlet and provided with a central axial opening, and a lateral opening extending from said central opening.

13. The combination of a container for molten glass having an outlet opening in the bottom thereof, a regulator in the glass above the outlet, a wall surrounding and spaced from the regulator, and means to supply glass to the container at one side of said regulator, said wall being provided with an inlet opening at the opposite side of the regulator from that at which the glass is supplied.

Signed at Toledo, in the county of Lucas and State of Ohio, this 7th day of June, 1922.

LEONARD D. SOUBIER the bottom thereof, a regulator in the glass above said outlet, a stationary wall surrounding and spaced from said regulator, and means for adjusting said wall up and down.

5. The combination of a container for molten glass, a well in the floor of the container provided with an outlet opening at the bottom thereof, a regulating plunger projecting downwardly through the glass in the container and into aid well, a wall within the container surrounding said plunger, a restricted passageway being provided between the lower end of the wall and the wall of said well, means to adjust said first mentioned wall up and down and thereby regulate the amount of glass passing through said passageway to the outlet, and means to direct a portion of the glass to the outlet independently of said restricted passageway.

6. The combination of a container for molten glass having an outlet opening in the bottom thereof, a regulator in the glass above said outlet, and a wall surrounding and spaced from said regulator, said wall extending from the surface of the glass substantially to the floor of the receptacle and provided with an inlet opening therethrough below the level of the glass in the container through which the glass enters said chamber in its passage to the said outlet.

7. The combination of a container for molten glass, a well in the floor of the container provided with a normally open outlet opening at the bottom thereof, means to cause a periodically regulated discharge of glass through said opening comprising a vertically reciprocating regulating plunger projecting downwardly through the glass in the container and into said well, a wall within the container surrounding said plunger, a restricted passageway being provided between the lower end of the wall and the wall of said well through which glass is directed to the outlet opening, and means for adjusting the size of said passageway.

8. The combination of a container for molten glass, having an outlet opening in the bottom thereof, a regulator in the glass above said outlet, a stationary wall surrounding said regulator and spaced from said outlet to permit the passage of a portion of the glass to said outlet, said wall having an inlet opening below the glass level through which another portion of the glass is directed in its passage to said outlet, and means to adjust said inlet opening and thereby regulate the proportion of glass passing therethrough.

9. The combination of a container for molten glass having an outlet opening in the bottom thereof, a regulator in the glass above said outlet, a stationary wall surrounding said regulator and spaced from said outlet to permit the passage of a portion of the glass to said outlet, said wall having an inlet opening below the glass level through which another portion of the glass is directed in its passage to said outlet, and means for adjusting said inlet opening up and down and thereby regulating the proportion of glass passing therethrough.

10. The combination of a container for molten glass having an outlet opening in the bottom thereof, a regulator in the glass above said outlet, and a wall surrounding and spaced from said regulator, said wall being provided with an inlet opening in one side thereof and rotatively adjustable about a vertical axis.

11. In an apparatus for feeding molten glass, the combination with a container for the glass provided with a submerged outlet, of means for controlling the flow of glass to the outlet comprising a member having an annular lower end submerged in the glass adjacent the outlet, and an inlet in said member through which the glass may flow downwardly through said annular lower end.

12. In an apparatus for segregating mold charges from a body of molten glass, the combination with a container for the glass provided with a discharge outlet, of a member in vertical alignment with said outlet and provided with a central axial opening, and a lateral opening extending from said central opening.

13. The combination of a container for molten glass having an outlet opening in the bottom thereof, a regulator in the glass above the outlet, a wall surrounding and spaced from the regulator, and means to supply glass to the container at one side of said regulator, said wall being provided with an inlet opening at the opposite side of the regulator from that at which the glass is supplied.

Signed at Toledo, in the county of Lucas and State of Ohio, this 7th day of June, 1922.

LEONARD D. SOUBIER

DISCLAIMER.

1,614,936.—*Leonard D. Soubier*, Toledo, Ohio. GLASS FEEDER. Patent dated January 18, 1927. Disclaimer filed April 2, 1927, by the assignee, *The Owens Bottle Company*.

Hereby enters this disclaimer of claim 4 of said patent, which is in the following words, to wit:

"4. The combination of a container for molten glass having an outlet opening in the bottom thereof, a regulator in the glass above said outlet, a stationary wall surrounding and spaced from said regulator, and means for adjusting said wall up and down."

[*Official Gazette April 19, 1927.*]

DISCLAIMER.

1,614,936.—*Leonard D. Soulier*, Toledo, Ohio. GLASS FEEDER. Patent dated January 18, 1927. Disclaimer filed April 2, 1927, by the assignee, *The Owens Bottle Company*.

Hereby enters this disclaimer of claim 4 of said patent, which is in the following words, to wit:

"4. The combination of a container for molten glass having an outlet opening in the bottom thereof, a regulator in the glass above said outlet, a stationary wall surrounding and spaced from said regulator, and means for adjusting said wall up and down."

[*Official Gazette April 19, 1927.*]